US005932859A

United States Patent [19]

Ijichi et al.

[11] Patent Number: 5,932,859

[45] Date of Patent: Aug. 3, 1999

[54] ELECTRONIC-MONEY REWARDING SYSTEM FOR LOST AND FOUND IC CARD

[75] Inventors: Makoto Ijichi, Yokohama; Shigeyuki Itoh, Zushi; Masaaki Hiroya, Yokohama; Hiroshi Asao, Kashiwa; Naomi Sato, Kawasaki; Kei Yonezawa, Kawasaki, all of Japan

[73] Assignee: Hitachi, Ltd., Tokyo, Japan

[21] Appl. No.: 08/836,703

[22] PCT Filed: Aug. 23, 1995

[86] PCT No.: PCT/JP95/01669

§ 371 Date: May 19, 1997

§ 102(e) Date: May 19, 1997

[87] PCT Pub. No.: WO96/17316

PCT Pub. Date: Jun. 6, 1996

[30] Foreign Application Priority Data

Dec. 2, 1994 [JP] Japan .................................... 6-298737

[51] Int. Cl.[6] ........................................................ G06K 5/00

[52] U.S. Cl. ............................................ 235/380; 235/379

[58] Field of Search .................................... 235/380, 375, 235/379, 492; 902/25, 26

[56] References Cited

U.S. PATENT DOCUMENTS 4,271,352 6/1981 Thomas .................................. 235/375
4,630,201 12/1986 White ...................................... 235/379
4,780,601 10/1988 Vermesse ................................ 235/375
4,839,504 6/1989 Nakano .................................. 235/379
4,882,473 11/1989 Bergeron et al. ....................... 235/380
4,904,851 2/1990 Yukino ..................................... 902/26
4,968,873 11/1990 Dethloff et al. ........................ 235/379
5,120,939 6/1992 Clause et al. ........................... 235/380
5,204,663 4/1993 Lee .................................... 340/825.34
5,221,383 6/1993 Gutman et al. ......................... 235/379
5,239,166 8/1993 Graves .................................... 235/492
5,434,395 7/1995 Storck et al. ........................... 235/380
5,459,304 10/1995 Eisenmann ............................. 235/380
5,508,501 4/1996 Fujimoto et al. ....................... 235/492
5,594,233 1/1997 Kenneth et al. ........................ 235/492
5,696,366 12/1997 Ziarno .................................... 235/380
5,761,309 6/1998 Ohashi et al. ............................ 380/25

*Primary Examiner*—Donald Hajec
*Assistant Examiner*—Diane I Lee
*Attorney, Agent, or Firm*—Antonelli, Terry, Stout & Kraus, LLP

[57] ABSTRACT

An electronic-money collecting system is capable of returning a lost IC card used as an 'electronic purse' to the owner of the lost IC card or an institution issuing the lost IC card with a high degree of efficiency without imposing a burden on the lost-IC-card finder or the institution issuing the IC card. When a lost IC card in which money data representing the amount of electronic money stored on the card is found, the found IC card is inserted into a terminal installed at places, such as a banking organization or a public institution. At that time, information read out from the IC card is transmitted to a center by way of a communication line. At the center, a storage unit is searched for information on the legitimate owner of the IC card, such as information for contacting the owner. The owner of the lost IC card is then notified of the implementation of processing to collect the IC card by telephone, through the post or through an electronic mail using a communication means. In order to increase the rate of collection of lost IC cards, a lost-IC-card finder is given reward money which is set in accordance with the amount of money recorded in a found IC card. In addition, when an attempt made by a lost-IC-card finder to illegally draw money from a found IC card is detected, information on the lost-IC-card finder who makes the attempt to draw money from the found IC card is recorded, allowing the abuse of a found IC card to be detected early.

23 Claims, 12 Drawing Sheets

600
IC-card-finding-record table

| | | | |
|---|---|---|---|
| 1 Lost-IC-card finder | Name 601 | Santa Hitachi | Jiro Yamada |
| | Adderss 602 | Juichi-cho Hitachi-shi | Ohta-cho Kawasaki-shi |
| | Telephone number 603 | 666-111-5555 | 333-123-456 |
| | IC-card ID number 604 | 334455 | 123456 |
| | Wallet ID number 605 | WA01234 | WA02345 |
| 2 IC-card loser | Name 610 | Taro Hitachi | Ichiro Suzuki |
| | Address 611 | Juii-cho Hitachi-shi | Kanazawa-ku Yokohama-shi |
| | Telephone number 612 | 012-345-6489 | 123-995-123 |
| | IC-card ID number 613 | 112233 | 453456 |
| | Wallet ID number 614 | WA11234 | WA45365 |
| | Password 615 | 1234 | 5151 |
| | Money data 616 | 5875 | 23850 |
| | Money record 617 | 1/1 +¥5000 | 4/3 +¥10000 |
| | | 2/1 -1000 | 4/7 -1000 |
| | | | |
| | Personal information 618 | Taro Yamada | Hanako Sato |
| | | TEl.012 | 8/19 meeting |
| | Pseudo Password 619 | 1111,2222 | 5155,3131 |
| Center-transmission time 620 | | '94.8.17 15:01 | '94.8.19 9:01 |
| Illegally used wallet ID number 630 | | WA01234 | WA55555 |
| Illegal-Password-input count 640 | | 2 | 0 |
| Password-input time 650 | | 15:05 | 9:03 |

| | | |
|---|---|---|
| 301 | Name | Taro Hitachi |
| 302 | Address | 123 Juji-cho Hitachi-shi |
| 303 | Telephone number | 012-345-6789 |
| 304 | card ID number | 1234-5678 |
| 305 | Wallet ID number | 8888-65 |
| 306 | Password | 1234 |
| 307 | The amount of money | ¥5875 |
| 308 | Money record | 12/01/94 -¥5000 01/01/95 -¥1000 |
| | | 03/03/95 -¥3000 04/05/95 +¥7000 |
| | | |
| 309 | Personal information | Taro Hitachi Tel. 987-654-321<br>08/17/95 Patent patrol |
| 310 | Pseudo password | 1111,2222,3333 |
| 311 | Unauthorized-use wallet ID number | |
| 312 | Password-input count | 0 |
| 313 | Password-input time | |
| 314 | Incorrect-password-input-count upper limit | 3 |

FIG.5

500

IC-card information table

| | | |
|---|---|---|
| 501 | Name | Jiro Hitachi |
| 502 | Address | Kanagawa-ken Yokonama-shi,Midori-ku,123 |
| 503 | Telephone number | 001-022-003 |
| 504 | Card ID number | 999888 |
| 505 | Wallet ID number | 12345 |
| 506 | Password | 5050 |
| 507 | The amount of money | ¥150000 |
| 508 | Account number | 918273645 |
| 509 | Pseudo password | 1111,2222,3333 |

FIG.6

600

IC-card-finding-record table

| | | | |
|---|---|---|---|
| 1 Lost-IC-card finder | Name 601 | Santa Hitachi | Jiro Yamada |
| | Adderss 602 | Juichi-cho Hitachi-shi | Ohta-cho Kawasaki-shi |
| | Telephone number 603 | 666-111-5555 | 333-123-456 |
| | IC-card ID number 604 | 334455 | 123456 |
| | Wallet ID number 605 | WA01234 | WA02345 |
| 2 IC-card loser | Name 610 | Taro Hitachi | Ichiro Suzuki |
| | Address 611 | Juii-cho Hitachi-shi | Kanazawa-ku Yokohama-shi |
| | Telephone number 612 | 012-345-6489 | 123-995-123 |
| | IC-card ID number 613 | 112233 | 453456 |
| | Wallet ID number 614 | WA11234 | WA45365 |
| | Password 615 | 1234 | 5151 |
| | Money data 616 | 5875 | 23850 |
| | Money record 617 | 1/1 +¥5000 | 4/3 +¥10000 |
| | | 2/1 -1000 | 4/7 -1000 |
| | | | |
| | Personal information 618 | Taro Yamada | Hanako Sato |
| | | TEl.012 | 8/19 meeting |
| | Pseudo Password 619 | 1111,2222 | 5155,3131 |
| Center-transmission time 620 | | '94.8.17 15:01 | '94.8.19 9:01 |
| Illegally used wallet ID number 630 | | WA01234 | WA55555 |
| Illegal-Password-input count 640 | | 2 | 0 |
| Password-input time 650 | | 15:05 | 9:03 |

FIG.7

700

Reward-money-rate table

| Amount of money (701) | Rate (702) | Illegal-password-input count (703) | First multiplier (704) | Time interval (705) | Second multiplier (706) |
|---|---|---|---|---|---|
| Less than 100,000 yen | 0.1 | 0 | 1.0 | 2 hours | 1 |
| 100,000 – 500,000 yen | 0.09 | 1 | 0.9 | 4 hours | 0.9 |
| 500,000 – 1,000,000 yen | 0.08 | 2 | 0.7 | 6 hours | 0.8 |
| | | 3 | 0.5 | | |
| | | | | | |

1

2

FIG.8

800

IC-card-revocation-condition table

| Annual-illegal-IC-card-usage-count upper limit (801) | Finding time interval (802) | Maximum number of times a lost IC card can be reported within the finding time interval 802 (803) |
|---|---|---|
| | | |

ELECTRONIC-MONEY REWARDING SYSTEM FOR LOST AND FOUND IC CARD

BACKGROUND OF THE INVENTION

The present invention relates to an electronic-money collecting system which is used for electronically collecting a lost IC card (debit card) containing electronic money.

A system which allows an IC card for recording money data issued by a banking organization to be used as an electronic purse has been described in the article 'Value Transfer System' in International Publication No. WO91/16691 (or Japanese Patent Laid-open No. Hei 5-504643). Electronic purses, each implemented by an IC card (sometimes referred to as a debit card), make up an 'electronic-purse' system in conjunction with an account management system for loading money into an electronic purse and for controlling the exact calculation of money transactions. The 'electronic-purse' system electronically transfers money from a bank account into a memory in an IC card, treating the IC card like an 'electronic purse'. In this case, since money (or strictly speaking, money data) stored in the IC card is in actuality neither a bill nor a coin, the term 'electronic money' is used in order to distinguish the money stored in an IC card from a bill or a coin. Money can be transferred from one IC card to another IC card through an account management system. In such a transfer of money, it is not necessary for the user to confirm the transfer of money with a banking organization. As a result, the processing to transfer money can be carried out in the same way as transferring cash to another person. In addition, at a banking organization, electronic money can be transferred and drawn as in the case of a cash transaction.

At any rate, in many cases, transaction processing using an 'electronic purse' implemented by an IC card can be carried out without the need for confirmation of money transfer by a banking organization. As a result, when an IC card is lost, the money stored in the IC card is also lost, and like ordinary money, it is impossible to recover the money stored in the lost IC card unless the IC card itself is found. In addition, even if the lost IC card is found by a third person, the amount of money stored therein is not visible, giving rise to a problem that the probability that the lost IC card will be returned to the owner or reported to the institution issuing the IC card or to the police is very low. Thus, there has been a problem that money stored in a lost electronic purse will never be recovered in comparison with cash.

In addition, even if the lost IC card is reported to the institution issuing the IC card, the institution needs to follow a procedure for finding the legitimate owner of the reported IC card and for returning the IC card to the owner or re-issuing a new IC card in answer to a request made by the owner of the lost IC card, giving rise to a problem that the burdens to be borne by the institution and the owner losing the IC card itself are heavy.

SUMMARY OF THE INVENTION

It is thus an object of the present invention to provide an electronic-money collecting system which is capable of returning a lost IC card serving as an 'electronic purse' to the owner or an institution issuing the lost IC card with a high degree of efficiency without imposing a heavy burden on the IC-card finder or the IC card issuing institution.

It is another object of the present invention to provide an electronic-money collecting system which is capable of enhancing the possibility of collection of money stored in a lost IC card by giving a finder of the lost IC card a predetermined amount of reward money.

It is a still further object of the present invention to provide an electronic-money collecting system which is capable of preventing a bad faith finder of a lost IC card from being given reward money.

In order to achieve the objects described above, the present invention provides an electronic-money collecting system wherein, when a found IC card having money recorded therein is inserted into a terminal unit installed at an institution, such as a banking organization or a public facility, money stored in the IC card is electronically collected; information read out from the IC card is transmitted to a control center by way of a transmission line; information on the legitimate owner of the IC card, such as the address of the owner, is used by the control center for automatically searching for the owner; and the owner is notified by a communication of the processing to collect the money stored in the IC card. Accompanying the electronic collection of the money, the IC card itself may or may not be physically retained in the terminal unit.

As described above, in order to increase the possibility of collection, a predetermined amount of reward money is given to a finder of a lost IC card. The reward money is given to a finder of a lost IC card by adding money corresponding to a certain amount of reward money to money data stored in the IC card of the lost-IC-card finder. For example, when a lost IC card of an unknown owner is found, the lost-IC-card finder can go to an institution, such as a banking organization or a public facility at which a terminal unit is installed, and insert the found IC card into the terminal unit. Then, information is read out from the IC card automatically and a collection processing is carried out. At the same time, reward money is given to the lost-IC-card finder. When the collection processing has been completed, the owner of the found IC card is notified by a communication of the completion of the collection processing, using a telephone, a letter or electronic mail.

After the notification, the owner of the found IC card follows a procedure to get back the amount of money stored in the found IC card. In this case, the reward money given to the finder of the IC card is subtracted from the original amount retrieved from the lost IC card.

In this way, the electronic-money collecting system is capable of returning a lost IC card to the owner or of collecting the lost IC card at an institution issuing the lost IC card with a high degree of efficiency without placing a troublesome burden on the finder of the IC card or the institution. Further, since a predetermined amount of reward money is added to money data stored in the IC card of the lost-IC-card finder, the possibility of collection or return of the lost IC card can be increased.

It should be noted that, when reward money is to be paid to a finder of a lost IC card, a person acting in bad faith, such as a person who steals the IC card of another person, may make an attempt to get some reward money by pretending to be a finder of a lost IC card. In order to avoid such bad faith, the number of times an incorrect password is entered, the ID of equipment used by the person of bad faith or other information are recorded. When the incorrect password has been entered a number of times exceeding a predetermined maximum number, the collection processing is terminated and the IC card of the person of bad faith is revoked.

BRIEF DESCRIPTION OF THE DRAWINGS

FIG. 5 is a diagram showing a typical example of an IC-card information table 500 stored in a storage unit 51;

FIG. 6 is a diagram showing a typical example of an IC-card-finding-record table 600 stored in the storage unit 51;

FIG. 7 is a diagram showing an example of a reward-money-rate table 700 stored in the storage unit 51;

FIG. 8 is a diagram showing an example of an IC-card-revocation-condition table 800 stored in the storage unit 51;

DETAILED DESCRIPTION OF THE PREFERRED EMBODIMENTS

Preferred embodiments of the present invention will be described with reference to the accompanying drawings.

Figure 1:
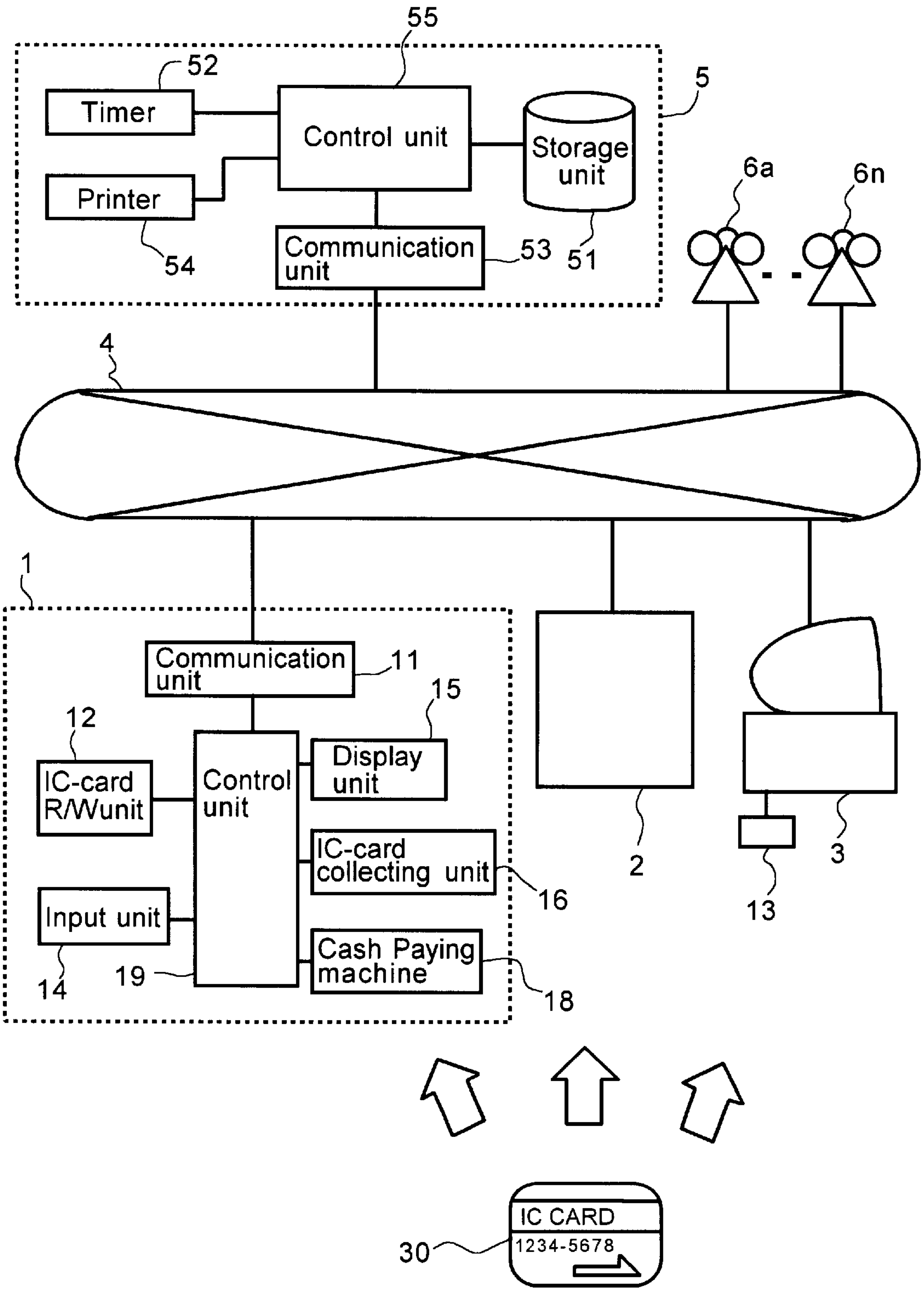
FIG. 1 is a schematic diagram showing the overall configuration of an embodiment implementing an electronic-money collecting system according to the present invention.

FIG. 1 is a schematic block diagram showing the overall configuration of an embodiment implementing an electronic-money collecting system according to the present invention. As shown in the figure, the electronic-money collecting system provided by the present invention comprises a plurality of terminal units 1, 2 and 3, a control center 5 and a communication system 4 for connecting the terminal units 1, 2 and 3 to the control center 5. A plurality of telephones 6*a* to 6*n* are provided for communicating with owners of IC cards who are called individually from the control center.

In this embodiment, there are provided three different types of terminal unit, i.e. terminal units 1, 2 and 3. In FIG. 1, only one unit is installed for each terminal unit type. In actuality, however, a plurality of terminal units can be installed for each type. The terminal unit 1 is typically a dedicated terminal unit installed at a financial institution, such as a bank. The terminal unit 1 comprises a communication unit 11 for carrying out communication with the control center 5; an IC-card R/W (read/write) unit 12 for reading out and writing information from and to a memory in an IC card; an input unit 14, such as a keyboard used by the user, for entering, among other data, information on the type of usage of the terminal unit; a display unit 15 for showing a variety of messages to the user; an IC-card collecting unit 16 for collecting a found IC card, a cash paying machine 18 for changing electronic money stored in an IC card inserted thereto to cash and paying the cash to the user; and a control unit 19 for controlling the various components constituting the terminal unit 1.

The terminal unit 2 is installed at places like a banking organization, a police station, a public institution such as a city hall, a train station, a school and a department store. Even though a detailed configuration of the terminal unit 2 is not shown in the figure, basically, the terminal unit 2 has the same configuration as the terminal unit 1. Depending upon the place at which the terminal unit 2 is installed, however, the cash paying machine 18 of the terminal unit 1 may be omitted from the configuration of the terminal unit 2 to prevent cash transactions at these locations.

The terminal unit 3 is a terminal unit installed at the home of the owner of an IC card for dedicated use by that person. Typically, the terminal unit 3 is a personal computer equipped with an IC-card R/W unit 13. A detailed configuration of the terminal unit 3 is not shown in the figure. However, the terminal unit 3 has the same configuration as the terminal unit 1, except that the IC-card collecting unit 16 and the cash paying machine 18 are eliminated from the configuration.

The control center 5 comprises: a storage unit 51 for storing various kinds of information, such as information identifying owners of IC cards, money transaction record information, information indicating reward-money rates of reward money to be given to lost-IC-card finders and IC-card-finding-record information of lost-IC-card finders; a timer 52 for computing the present time; a communication unit 53 for carrying out a communication with the terminal units 1, 2 and 3 and the telephones 6*a* to 6*n* through the communication line 4; a printer 54 for printing a message for use in notifying the owner of a lost IC card that the IC card has been found; and a control unit 55 for controlling all the components constituting the control center 5. The control center 5 is typically installed at an institution, such as a bank, at which the issuance of IC cards is controlled.

The IC card 30 is a medium for storing money data. The IC card 30 is used for electronically storing money data in place of cash and is used like a debit card. What is stored in the IC card 30 is information indicating an amount of money. Electronic money can be transferred to and from the IC card 30 by inserting the IC card into the IC-card R/W unit 12 or 13 of the terminal unit 1, 2 or 3 or into an electronic wallet to be described later.

Figure 2:
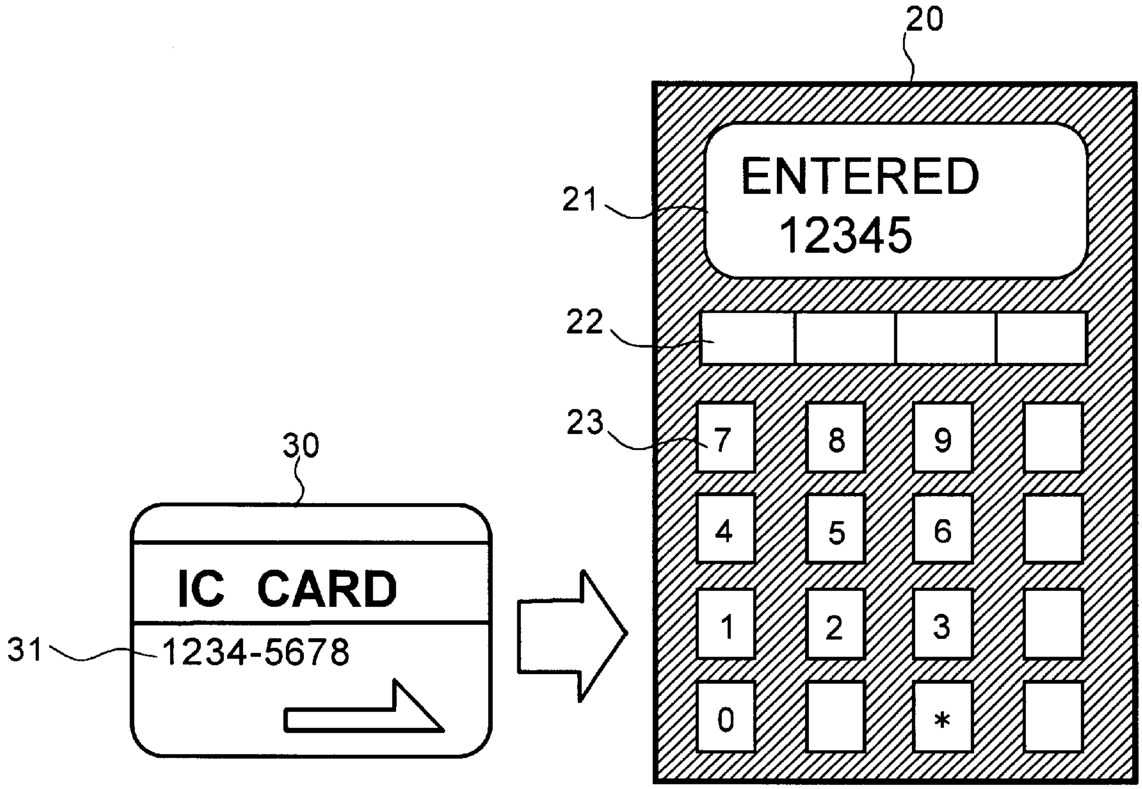
FIG. 2 is a diagram showing external views of an IC card 30 and a wallet 20 used in conjunction with the IC card 30.

FIG. 2 is a diagram showing external views of an IC card 30 and an electronic wallet 20 used in conjunction with the IC card 30. The wallet 20 is used by a person who owns the IC card 30. When the IC card 30 is inserted into the wallet 20, the wallet 20 plays the role of an intermediate portable terminal, performing such functions as confirming the amount of electronic money stored in the IC card 30 and transferring electronic money from one IC card to another. The wallet 20 also controls an operation to lock and unlock electronic money stored in an IC card 30 by means of a lock function which is used for locking electronic money stored in the IC card 30 so that a third person can not check the amount of electronic money or draw the electronic money from the IC card 30 at his/her own pleasure. The external appearance of the electronic wallet 20 can be made similar to that of a small portable calculator. As shown in the figure, the wallet 20 comprises a liquid crystal display unit 21, function keys 22, a ten-key pad 23 and an IC-card insert window, which is not shown in the figure.

On the surface of the IC card 30 to be inserted into the wallet 20, various kinds of information, such as an ID number 31 of the IC card, can be printed, if necessary.

Figure 3:
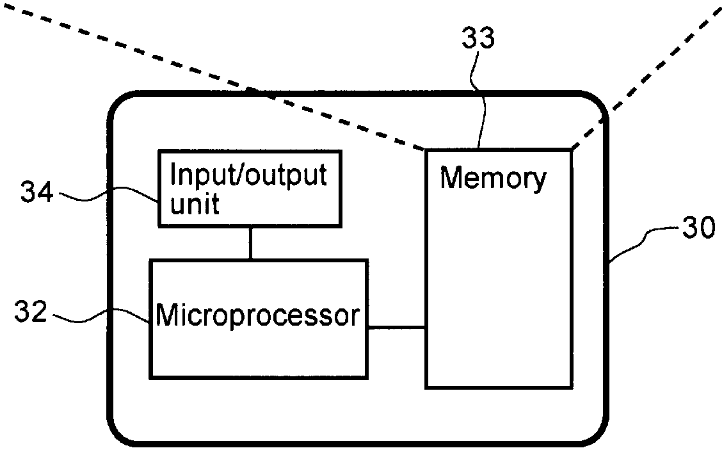
FIG. 3 is a diagram showing the configuration of the IC card 30 and the structure of data stored therein.

FIG. 3 is a diagram showing the configuration of the IC card 30 issued by a banking organization and the structure of data stored therein. An input/output unit 34 forms an interface for transferring information to and from an IC card using one of two methods. In one of the methods, information is exchanged electrically by way of metallic contacts provided on the IC card. The other method is a non-contact method whereby the IC card 31 is inserted into the wallet 20 and information is exchanged in a wireless way between the IC card and the input/output unit 34. In the case of the non-contact method, the protection of information confidentiality can be strengthened by setting the distance from the input/output unit 34 to the IC-card R/W unit 12 at about 0.1 to 10 mm. A memory unit 33 is used for recording an amount of electronic money stored in the IC card 30 and a transaction record of money transfers. A non-volatile memory is typically used as the memory unit 33. A microprocessor 32 is used for controlling transfers of information between the input/output unit 34 and the memory unit 33 and operations to produce the transaction record.

As shown in an enlarged form in FIG. 3, the memory unit 33 is used for storing, among other things, information identifying the legitimate owner of the IC card. The information includes the name 301 of the owner, an address 302, a telephone number 303, an IC-card ID number 304 and a wallet ID number 305 of the electronic wallet owned by the owner of the IC card. In addition, a password 306 is used for transferring electronic money from the IC card. An amount of money 307 is money data on which a transfer of money or an exchange of money is carried out. The amount of money 307 indicates a balance on which a cash settlement can be carried out by using the IC card 30. The amount of money 307 is nucleus information on the electronic money. A money record 308 is used for recording information on transactions made in the past. Personal information 309 is information written and read out personally by the owner of the IC card. The personal information 309 can be used as a memo by the user. The pieces of information 301 to 309 described above are stored for use in electronic-money transactions, while other information described below is used for preventing the IC card from being used illegally.

A pseudo password 310 is used for early detection of a third person who makes an attempt to illegally draw electronic money from the IC card. The pseudo password 310 is typically a number which is likely to be suggested to the mind of an unauthorized user. An example of such a number is the birthday or the telephone number of the legitimate user of the IC card. If such a number is entered by a person, the person will be detected as an unauthorized user and processing to collect the money stored in the IC card 30 will be forcibly carried out. An unauthorized-use wallet ID number 311 is a wallet ID number acquired during an attempt made by an unauthorized user to draw electronic money, that is, the ID of a wallet owned or used by the unauthorized user. A password-input count 312 is stored representing the number of times an incorrect password has been entered.

Each time an incorrect password is entered, the password-input count 312 is incremented by one. When a correct password is entered, however, the password-input count 312 is cleared to zero. A password-input time 313 indicates the most recent time at which a password was entered. An incorrect-password-input-count upper limit value 314 represents an upper limit of the number of times the IC card allows an incorrect password to be entered consecutively. In the example shown in FIG. 3, the IC card allows an incorrect password to be entered up to 3 times. Thus, when the password-input count 312 is incremented to 4, the operation to draw money from the IC card is terminated.

Figure 4:
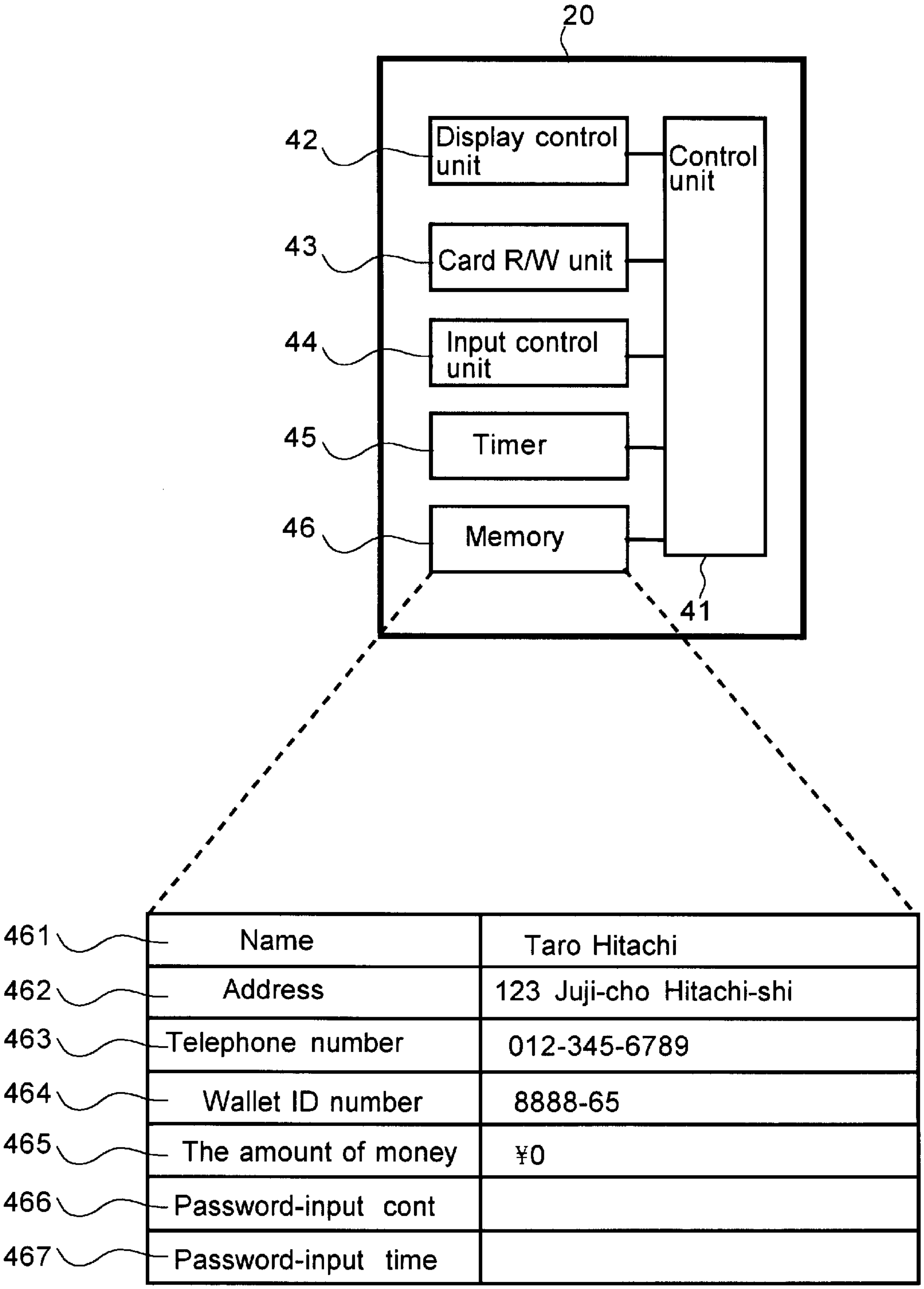
FIG. 4 is a diagram showing the configuration of the wallet 20 and the structure of data stored therein.

FIG. 4 is a diagram showing a detailed configuration of the electronic wallet 20 shown in FIG. 2. A display control unit 42 includes the liquid-crystal display unit 21 shown in FIG. 2. The display control unit 42 is used for displaying various kinds of information, such as operation procedures and instructions/guidances to the user. An IC-card R/W unit 43 is used for reading out and writing information from and to the memory unit 33 of an IC card 30 inserted therein. An input control unit 44, which comprises function keys 22 and the ten-key pad 23, is used for inputting information required for control of the electronic wallet 20. A timer 45 is used for recording a time at which the password of a found IC card 30 was input from the wallet 20. A memory unit 46 is a storage means which is externally accessible. The memory unit 46 is used for storing information concerning the owner of the wallet 20, such as his or her name 461, address 462 and telephone number 463, the wallet ID number 464, an amount of money 465, a password-input count 466 and a password input time 467, a time at which a password was entered from the input control unit 44 when an attempt was made to use a found IC card 7 illegally. The amount of money 465 recorded in the memory unit 46 is stored temporarily in the wallet 20 from the IC card. A control unit 41 fetches data from the other components, stores the data and controls operations of the other components in accordance with a program stored internally.

Next, details of information stored in a storage unit 51 of the control center 5 will be explained by referring to FIGS. 5 to 9. The storage unit 51 includes four tables: an IC card-information table 500, an IC-card-finding-record table 600, a reward-money-rate table 700 and an IC-card-revocation-condition table 800.

FIG. 5 is a diagram showing a typical detailed structure of the IC card-information table 500 stored in the storage unit 51 in the control center 5. The IC card-information table 500 contains information relating to a plurality of IC-card owners. As shown in the figure, the information concerning each IC-card owner includes the name 501 of the IC-card owner, an address 502, a telephone number 503, an IC-card ID number 504 serving as a unique identification of the IC-card owner, a wallet ID number 505 serving as an ID number of a wallet 20 owned by the IC-card owner, a password 506 for protecting the confidentiality of the IC-card owner, an amount of money 507 representing a balance left in the account of the IC-card owner, an account number 508 and a pseudo password 509 for avoiding unauthorized use of the IC card. Here, since a transfer of electronic money provided by the present embodiment can be carried out without the need for confirmation with a banking organization, the amount of money 507 is not equal to the amount of money 307 stored in the IC card. Instead, the amount of money 507 is the amount of money representing the balance in an account in a bank or the like, that is, the amount of money representing the amount balance from which money can be withdrawn and stored in the IC card.

FIG. 6 is a diagram showing a typical detailed structure of the IC-card-finding-record table 600 stored in the storage unit 51 employed in the control center 5. The IC-card-finding-record table 600 contains IC-card-finding-record information identifying a finder of a lost IC card 30, including the name 601 of the lost-IC-card finder, an address 602, a telephone number 603, the IC-card ID number 604 of the lost-IC-card finder, and the wallet ID number 605 of the lost-IC-card finder. The IC-card-finding-record table 600 also contains information identifying the owner of a lost IC card which was found by the lost-IC-card finder, including the name 610, address 611 and telephone number 612 of the owner, an IC-card ID number 613, a wallet ID number 614, a password 615, money data 616, a money record 617, personal information 618 and a pseudo password 619 for prevention of unauthorized use of the IC card. Here, the money data 616 corresponds to the amount of money 307 stored in the IC card 30. The IC-card-finding-record table 600 also includes additional information relating to each lost-IC-card finder, such as a center-transmission time 620 at which the finding of the lost IC card was reported to the control center, an illegally used wallet ID number 630 used in an attempt to illegally draw electronic money, an illegal-password-input count 640 indicating the number of times an incorrect password has been entered in an attempt to illegally draw electronic money and a password-input time 650 at which the password was entered. In the figure, only two lost-IC-card finders and two IC-card losers are shown. In actuality, however, the storage unit 51 has a recording area for storing a plurality of lost-IC-card finders and IC-card losers.

FIG. 7 is a diagram showing details of the reward-money-rate table 700 stored in the storage unit 51 employed in the control center 5. The reward-money-rate table 700 includes standards used for computing the amount of reward money to be given to a lost-IC-card finder in dependence upon the amount of money 307 recorded in a found IC card 30.

In this example, the amount of money 701 is divided into a plurality of levels. The larger the amount of money 701, the smaller the rate 702. Further, the reward-money-rate table 700 also stores a first multiplier 704 which serves as a first parameter used for changing the rate. The magnitude of the first multiplier 704 is dependent upon an illegal-password-input count 703 indicating the number of times a password has been entered to a wallet 20 in an attempt to illegally use the found IC card. Also stored in the reward-money-rate table 700 is a second multiplier 706 which serves as a second parameter used for changing the rate. The magnitude of the second multiplier 704 is dependent upon the time interval 705 at which the passwords have been entered. The rate 702 is corrected by multiplying it by the first and second multipliers 704 and 706.

FIG. 8 is a diagram showing a detailed structure of the IC-card-revocation-condition table 800 stored in the storage unit 51. As shown in the figure, the IC-card-revocation-condition table 800 includes an annual illegal-IC-card-usage count upper limit 801 indicating the maximum number of times a found IC card can be reported in one year, a finding time interval 802 and a maximum number of times 803 a found IC card can be reported within the finding time interval 802.

The IC-card-revocation-condition table 800 is provided for limiting the number of times a particular individual may illegally take an IC card 30 of another person and illegally receive reward money for the IC card 30. For example, in the case of a lost-IC-card finder who has found IC cards more than 10 times in a year, the IC card 30 of the lost-IC-card finder is revoked and the found IC cards 30 are collected. By the same token, if IC cards 30 are found a number of times exceeding the maximum number of times 803 a found IC card can be reported within the finding time interval 802, the IC card 30 of the lost-IC-card finder itself is revoked and the found IC cards 30 are collected. In this way, misconduct on the part of a person involving collection of reward money can be distinguished from truly good conduct in finding a lost IC card, allowing the number of misconducts involving illegally taking reward money to be limited.

Figure 9:
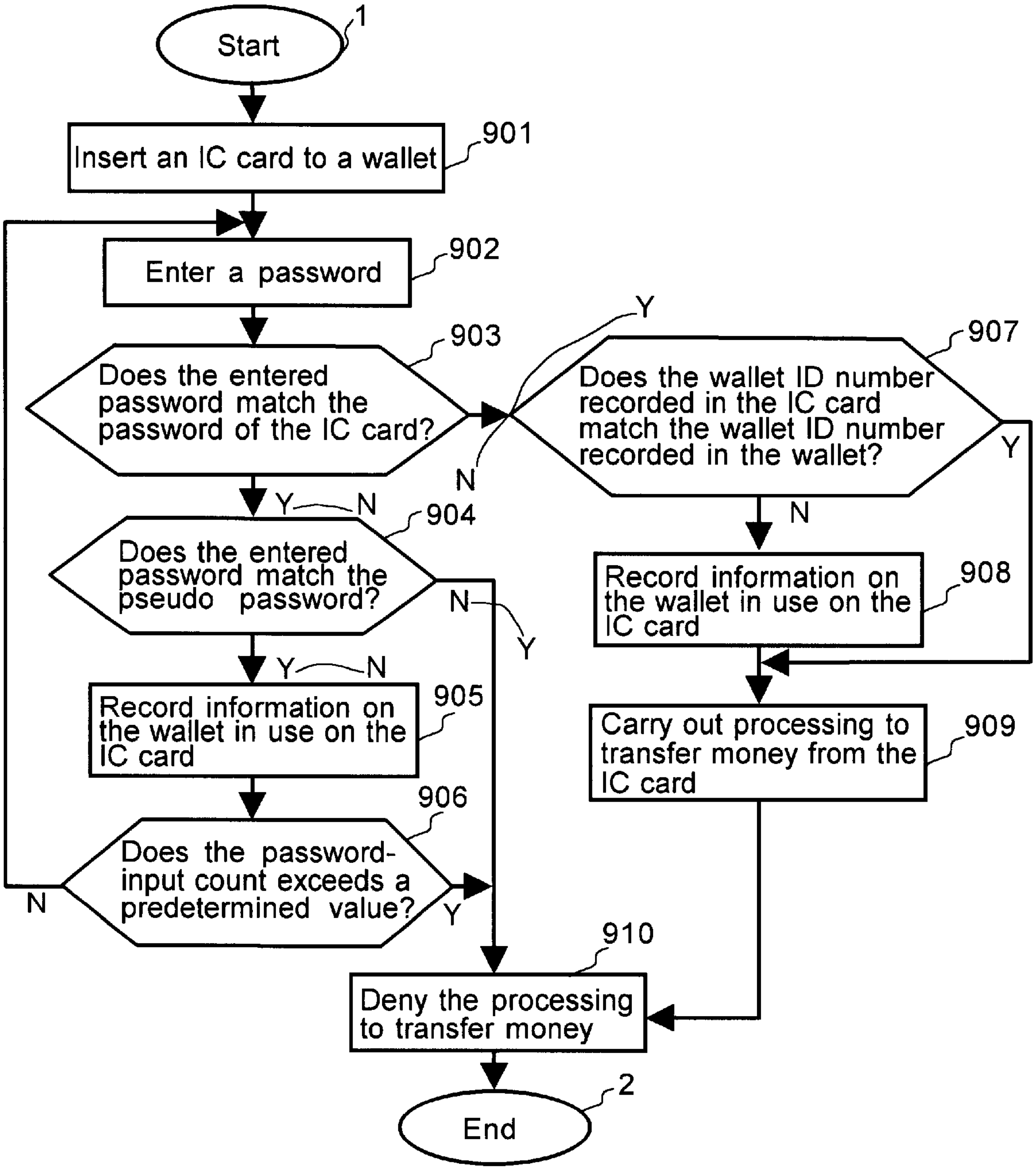
FIG. 9 is a flowchart showing steps in a procedure of money transfer processing using the wallet and the IC card 30.

Next, a processing to transfer electronic money from an IC card 30 to another IC card through a wallet 20 will be explained by referring to FIG. 9.

As shown in the figure, the processing begins with a step 901 at which the user inserts an IC card 30 into a wallet 20. The processing flow then goes on to a step 902 at which processing to transfer electronic money from one IC card to another is requested by pressing one of the function keys 22 provided for this purpose. As the function key 22 is pressed, a message saying: "Enter a password" is displayed on the display unit 21 of the wallet 20. In response to this message, the user enters a password. After a password has been entered by the user, the processing flow proceeds to a step 903 at which the microprocessor 32 compares the entered password with a password 306 recorded in the IC card 30 to find out whether or not the former matches the latter.

If the former matches the latter, the processing flow continues to a step 907 at which a wallet ID number 305 of the owner of the IC card recorded in the IC card is compared to a wallet ID number 464 stored in wallet 20 to find out whether or not the former matches the latter. If the former does not match the latter, it is possible that the IC card 30 is being used illegally. In this case, the processing flow goes on to a step 908 at which, before the money data 307 recorded in the memory unit 33 of the inserted IC card 30 and other data are transferred to a transfer-destination IC card, information such as the wallet ID number 464 stored in the wallet 20 is appended to the money data 307 and the information is recorded in the money data memory area 465 of the wallet 20.

If the result of the comparison carried out at the step 907 indicates that the wallet ID number 305 matches the wallet ID number 464, on the other hand, the user who inserted the IC card 30 into the wallet 20 is regarded as the legitimate owner of the IC card 30. In this case, the processing flow goes on to a step 909. At this step, the unauthorized-use wallet ID number 311 of the IC card 30 is cleared, whereas the password-input count 312 and the password-input time 313 of the IC card 30, as well as the password-input count 466 and the password-input time 467 of the wallet 20, are reset to zero. A message saying: "Enter the amount of money to be transferred" is then displayed on the display unit 21. In response to this message, the user enters the amount of money to be transferred. Then, the specified amount of money is transferred from the IC card 30 serving as a transfer source to the memory unit 46 of the wallet 20. As the specified amount of money is transferred, the amount of money 465 is increased temporarily. Then, the transfer-source IC card is taken out from the wallet 20 and the transfer-destination IC card is inserted into the wallet 20. The electronic money temporarily transferred to the wallet 20 is then transferred to the memory unit 33 of the transfer-destination IC card 30, completing the processing.

If the result of the comparison carried out at the step 903 indicates that the password entered via the ten-key pad 23 does not match the password 306, on the other hand, it is possible that the IC card 30 is being used illegally. In this case, the processing flow goes on to a step 904 at which the entered password is compared with the pseudo password 310 that is most likely used by an unauthorized person making an attempt to illegally draw electronic money from the IC card to find out whether or not the former matches the latter. If the entered password matches the pseudo password 310, the user is detected as an unauthorized user rather than the legitimate owner of the inserted IC card. In this case, the processing flow proceeds to a step 910 at which the request to transfer electronic money from the inserted IC card 30 is rejected.

If the result of the comparison carried out at the step 904 indicates that the entered password does not match the pseudo password 310, on the other hand, the processing flow goes on to a step 905 at which the wallet ID number 464 of the wallet 20 is recorded in the unauthorized-use wallet ID number 311 of the card 30; the number of times an incorrect password has been entered via the ten-keys 23 for the unauthorized use is counted; the count value is recorded in the password-input count 312 of the card 30; and a time at which a password was entered for the first time is obtained from the timer 45 of the wallet 20 and recorded in the password-input time 313 of the card 30.

Then, the processing flow goes on to a step 906 at which the password-input count 312 produced by the wallet 20 is compared with the incorrect-password-input-count upper limit 314 indicating the number of times the IC card allows an incorrect password to be entered consecutively to find out whether or not the former exceeds the latter. If the former has exceeded the latter, the processing flow goes on to the step 910 at which the request to transfer electronic money from the inserted IC card 30 is rejected. If the former has not exceeded the latter, on the other hand, the processing returns to the step 902.

As described above, in this embodiment, at the step 905, the password-input count and the password-input time are stored in the memory 33 of the IC card 30. It should be noted, however, that they can also be stored at areas 466 and 467, respectively, of the memory unit 46 employed in the wallet 20.

Next, operations which are carried out to render a variety of services using an IC card 30 will be explained by referring to the flowchart shown in FIG. 10. Such services include typically conversion of electronic money stored in the IC card 30 into cash by means of a terminal unit 1, a transfer of electronic money to and from the IC card 30 and purchasing of a commodity by using electronic money stored in the IC card 30.

Figure 10:
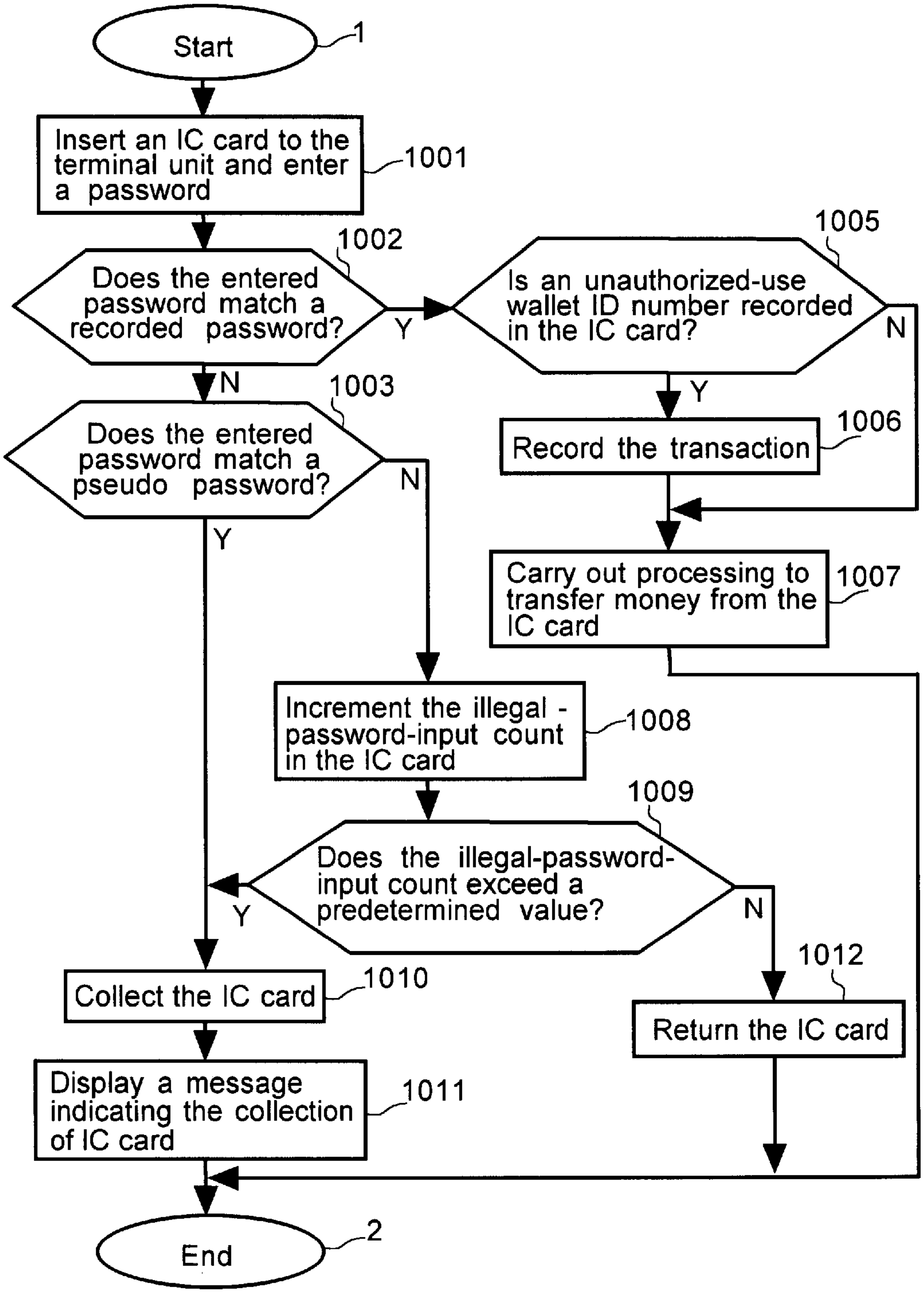
FIG. 10 is a flowchart showing steps in a procedure of money transfer processing using the wallet and the IC card 30 at a terminal unit.

As shown in FIG. 10, the flowchart begins with a step 1001 at which the user inserts an IC card 30 into a terminal unit 1 used by the user and the IC-card R/W unit 12 reads out information from the memory unit 33 of the IC card 30. The processing flow then goes on to a step 1002 at which a password 306 read out from the memory unit 33 is compared with a password entered from the input unit 14 to find out whether or not the former matches the latter. At that time, values are set in the password-input time memory area 313 and the password-input count memory area 312 of the IC card 30.

If the former matches the latter, the processing flow proceeds to a step 1005 to find out whether or not an unauthorized-use wallet ID number 311 is recorded in the IC card 30. If an unauthorized-use wallet ID number 311 is not recorded, there is no reason to assume that the inserted IC card 30 has been illegally used. In this case, the processing flow goes on to a step 1007 at which the password-input time 313 of the IC card 30 is cleared and the password-input count 312 of the IC card 30 is reset to zero prior to the processing to transfer money from the IC card.

If an unauthorized-use wallet ID number 311 is found at the step 1005, on the other hand, the unauthorized-use wallet ID number 311 indicates that the inserted IC card 30 has been illegally used. It is thus quite within the bounds of possibility that this transaction is also unauthorized. In this case, the processing flow goes on to a step 1006 at which transaction information is recorded in a processing record for processing to transfer electronic money. For example, information such as the IC-card ID number 304 stored in the IC card 30 is appended to money data recorded in a host. The information is also recorded in the money data 307 of the found IC card 30 so that the money data 307 includes additional information on a transaction which was performed in the past.

Then, the processing flow goes on to the step 1007 at which, after the password-input time 313 of the IC card 30 is cleared and the password-input count 312 of the IC card 30 is reset to zero as described above, the processing to transfer electronic money from the IC card 30 is allowed.

If the comparison carried out at the step 1002 indicates that the password 306 read out from the memory unit 33 does not match the password entered from the input unit 14, on the other hand, it is possible that the IC card 30 is being used illegally. In this case, the processing flow goes on to a step 1003 at which the entered password is compared with the pseudo password 310 that is used for preventing unauthorized use of the IC card to find out whether or not the former matches the latter.

If the former matches the latter, the use of the IC card is considered to be illegal. In this case, the processing flow proceeds to a step 1010 at which the IC card 30 is collected and retained by the IC card collecting unit 16 in the terminal unit 1. Then, the processing flow goes on to a step 1011 at which a message explaining a reason why the IC card was collected and a message saying: "Please visit a window at the IC-card issuing institution" are displayed on the display unit 15, completing the processing.

If the result of the comparison carried out at the step 1003 indicates that the entered password does not match the pseudo password 310, on the other hand, the processing flow goes on to a step 1008 at which the password-input count 312 recorded in the IC card 30 is incremented by one. Then, the processing flow proceeds to a step 1009 at which the password-input count 312 is compared with the annual-illegal-IC-card-usage count upper limit 801 indicating the number of times the IC card has been used illegally so far, as stored in the IC-card-revocation-condition table 800 shown in FIG. 8. In addition, the IC-card-finding-record table 600 stored in the storage unit 51 is checked to find out whether or not the number of times the IC card has been found within the finding time interval 802 exceeds the maximum number 803.

If the maximum values used as standards are exceeded, the processing flow goes on to the step 1010 at which a signal to collect the IC card 30 is transmitted to the terminal unit 1. The IC card 30 is then collected by the IC card collecting unit 16 in the terminal unit 1. The processing flow then goes on to the step 1011 at which a message explaining a reason why the IC card was collected and a message saying: "Please visit a window at the IC-card issuing institution" are displayed on the display unit 15. If the maximum values are found to have not been exceeded at the step 1009, on the other hand, the processing flow continues to a step 1012 at which the IC card is returned.

Figure 11:
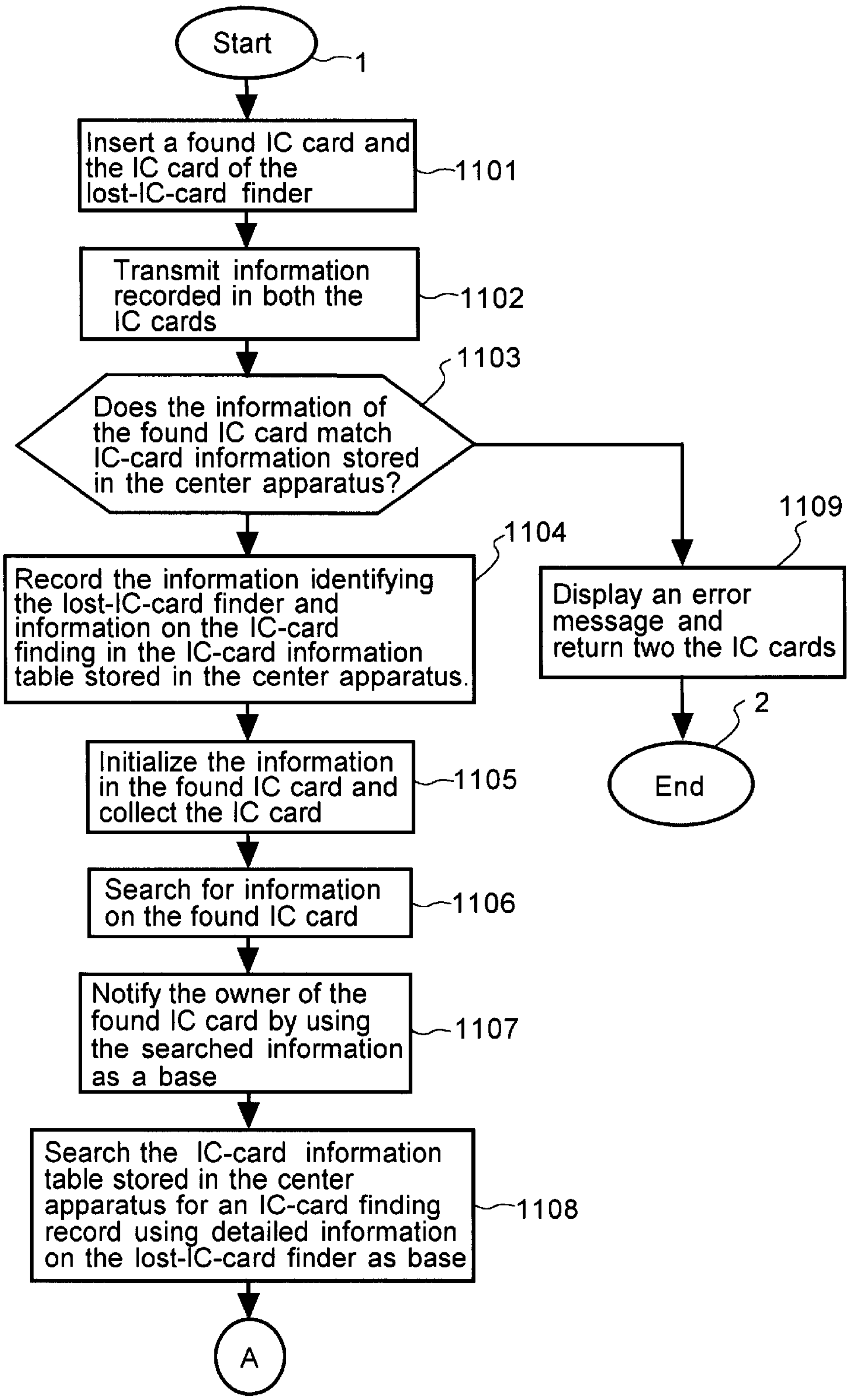
FIG. 11 is a flowchart showing steps in a procedure to collect a found IC card 30 carried out at the terminal unit.
Figure 12:
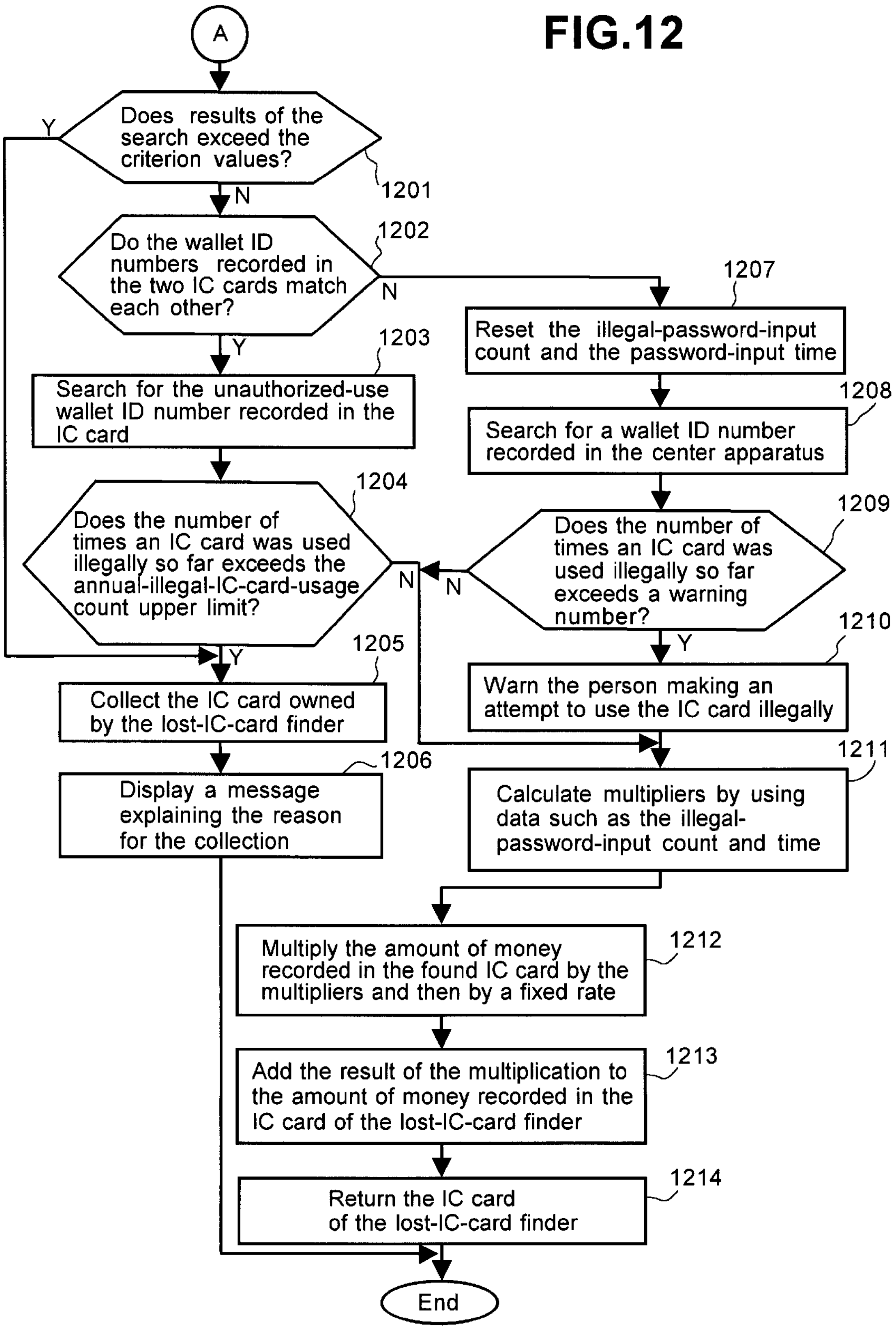
FIG. 12 is a flowchart showing a continuation of the process shown in FIG. 11.

Next, operations carried out by the present embodiment to collect a found IC card will be explained by referring to a flowchart shown in FIGS. 11 and 12. The flowchart shows processing to collect a found IC card at the terminal unit 2.

As shown in the figures, the flowchart begins with a step 1101 at which, first of all, a person finding a lost IC card 30 goes to a place at which a terminal unit 2 is installed to return the IC card to the owner. There, as a user of the terminal unit 1, the lost-IC-card finder will initiate operations to request collection of the found IC card from the input unit 14. The control unit 19 displays a message on the display unit 15 to request the user of the terminal unit 1 (the lost-IC-card finder), first, to insert the found IC card 30 into a predetermined insert window and, then, to insert the IC card 30 of the lost-IC-card finder be entered to the predetermined insert window. In response to the message, the lost-IC-card finder inserts the IC card 30 of the lost-IC-card finder and the found IC card 30 into the IC-card R/W unit 12. It should be noted that an IC card 30 may be locked in order to prevent other persons from drawing or checking electronic money without permission. For this reason, the found IC card 30 which was inserted therein is checked to find out whether or not the IC card 30 is locked. If locked, the control unit 19 automatically unlocks the IC card 30 before carrying out processing to collect the IC card 30. If the IC card 30 is not locked, on the other hand, the control unit 19 transmits information read out by the IC-card R/W unit 12 from the two IC cards, that is, information denoted by reference numerals 301 to 314 in FIG. 3, to the control center 5 by way of the communication unit 11 and the communication line 4 at the step 1102. In the case of the IC card information of the lost-IC-card finder, information for identifying the lost-IC-card finder is enough. It is thus sufficient to transmit only the name 301, the address 302, the telephone number 303, the IC card ID number 304 and the amount of money 307 to the host 5. It should be noted that the lost-IC-card finder may not have an IC card 30. In this case, the lost-IC-card finder can request an employee of a banking organization to carry out operations to collect the found IC card. As an alternative, the lost-IC-card finder can request that a new IC card 30 for the lost-IC-card finder be issued and that processing to collect the found IC card 30 by using the newly issued IC card 30 be carried out.

After the IC-card information identifying the person who lost an IC card and the finder of the IC card has been received from the terminal unit 1, the processing flow then goes on to a step 1103 at which the control unit 55 of the center apparatus 5 searches the storage unit 51 for the IC-card information table 500 by using information, such as the name 301, the address 302, the telephone number 303, the IC card ID number 304 and the password 306 recorded in the found IC card 30 received from the terminal unit 1 as a key in order to find out whether or not information matching this information is stored in the storage unit 51 If a result of the search carried out at the step 1103 indicates that no information stored in the storage unit 51 matches the information received from the terminal unit 1, the found IC card 30 is determined to be an IC card not cataloged in the control center 5, that is, an invalid IC card, such as a false IC card or an IC card with the usage thereof invalidated. In this case, the processing flow goes on to a step 1109 at which an error message saying: "This IC card can not be used" is sent to the terminal unit 1 to be displayed on the display unit 15 of the terminal unit 1, and the found IC card as well as the IC card of the lost-IC-card finder itself are returned.

If a result of the search carried out at the step 1103 indicates that information stored in the storage unit 51 matches the information received from the terminal unit 1, that is, the found IC card 30 is identified in the records of the control center 5, on the other hand, the processing flow proceeds to a step 1104 at which the control unit 55 of the control center 5 records information such as the names 601 and 610 of the finder of the IC card and the person losing the IC card in the IC-card-finding-record table 600. At the same time, the control unit 55 also records the wallet ID number 305 stored in the found IC card 30 into the wallet ID number memory area 630, the unauthorized-use wallet ID number 311 stored in the found IC card 30 into the illegally used wallet ID number memory area 630 used in an attempt to illegally draw electronic money and the password-input count 312 stored in the found IC card 30 into the illegal-password-input count memory area 640 indicating the number of times a password has been entered in an attempt to illegally draw electronic money. In addition, the control unit 55 obtains information on the present time from the timer 52, and stores the information as the center-transmission time in the memory area 620 as the time at which the finding of the lost IC card was reported to the center.

Then, the processing flow continues to a step 1105 at which the control unit 55 of the control center 5 transmits an initialization requesting signal and a collection requesting signal to initialize and collect the found IC card in the terminal unit 2. In response to these signals, the found IC card 30 which was inserted into the IC-card R/W unit 12 is initialized and then the found IC card 30 is collected by the IC card collecting unit 16 in the terminal unit 2. It should be noted that since the collected IC card 30 has been initialized, it can be used as a new IC card.

Then, the processing flow goes on to a step 1106 at which the control unit 55 searches for information relating to the person losing the IC card stored in the IC-card-finding-record table 600 for information for contacting the IC-card loser, such as the person's name 610, address 611 and telephone number 612.

The processing flow then goes on to a step 1107 at which the legitimate owner of the IC card is notified that the lost IC card has been found. The owner of the lost IC card can be contacted by electronic mail if the lost-IC-card owner has a dedicated terminal unit 3. Otherwise, a letter is printed on the printer 54 and sent to the owner through the post or the owner is contacted by telephone. It should be noted that determination as to whether or not electronic mail is used is based on the availability of an electronic-mail address in the telephone number 612 of the person losing the IC card as recorded in the IC-card-finding-record table 600 shown in FIG. 6.

The processing flow then proceeds to a step 1108 at which the control unit 55 searches the IC-card-finding-record table 600 for the name 601, address 602, telephone number 603 and the IC-card ID number 604 of the lost-IC-card finder in order to examine the past record of finding IC cards for the lost-IC-card finder who requested the processing to collect the found IC card, that is, to examine the number of requests for processing to collect a lost IC card made so far by that person and the finding time interval.

The processing flow then continues to a step 1201 at which results of the search operation carried out at the step 1108 are compared with conditions prescribed in the IC-card-revocation-condition table shown in FIG. 8 to find out whether or not the number of requests for processing to collect an IC card made so far exceeds the annual-illegal-IC-card-usage count upper limit 801 of the number of times an IC card can be found in a year and whether or not the number of times an IC card can be found within the finding time interval 802 exceeds the maximum number 803. A number of requests for processing to collect an IC card made so far which exceeds the annual-illegal-IC-card-usage count upper limit 801 or a number of times an IC card can be found within the finding time interval 802 which exceeds the maximum number 803 is regarded as an indication that it is feared that the lost-IC-card finder has illegally taken the IC card of another person. In this case, the processing flow goes on to a step 1205 at which a collection requesting signal is transmitted to the terminal unit 2 to collect the IC card of the lost-IC-card finder by means of the IC card collecting unit 16. Then, the processing flow continues to a step 1206 at which a message explaining the reason why the IC card was collected and a message saying: "Please visit a window at the IC-card issuing institution" are displayed on the display unit 15. That is to say, since the number of times that the lost-IC-card finder has found an IC card so far exceeds the reference value prescribed in the IC-card-revocation-condition table 800, the IC card 30 owned by the lost-IC-card finder itself is also collected and the reason for the collection is also indicated to the lost-IC-card finder.

If the number of requests for processing to collect an IC card made so far is found to be smaller than the annual-illegal-IC-card-usage count upper limit 801 set in the IC-card- revocation-condition table 800 or the number of times an IC card can be found within the finding time interval 802 is found to be smaller than the maximum number 803 in the same IC-card-revocation-condition table 800 at the step 1201, on the other hand, the processing flow goes on to a step 1202 at which the unauthorized-use wallet ID number 311 recorded in the IC card 30 of the lost-IC-card finder in an attempt to illegally use the IC card 30 is compared with the wallet ID number 305 recorded in the found IC card to find out whether or not the former matches the latter. If the former does not match the latter, the processing flow goes on to a step 1207 at which the password-input count 312 and the password-input time 313 of the found IC card 30 are reset to zero.

Then, the processing flow proceeds to a step 1208 at which the control unit 55 searches the IC-card-finding-record table 600 for the wallet ID number 311 which is recorded in an IC card in an attempt to illegally use the IC card 30. The processing flow then continues to a step 1209 at which a result of the search operation is compared with the contents of the IC card-IC-card-revocation-condition table stored in the storage unit 51 to find out whether or not the number of times an IC card was used illegally so far exceeds a warning number. For example, a number of times an IC card was used illegally so far which exceeds half the annual-illegal-IC-card-usage count upper limit 801, indicating the number of times an IC card can be used illegally per year, indicates that the lost-IC-card finder or the person making an attempt to use the IC card illegally (or the owner of the unauthorized-use wallet ID number 311) did not request processing to collect the IC card immediately. In this case, the processing flow goes on to a step 1210 to give a caution to the lost-IC-card finder or the owner of the unauthorized-use wallet ID number not to use the IC card for other purposes or use the IC card illegally at a DM or similar places. Here, in giving a warning prior to revocation of the IC card 30 of the lost-IC-card finder, a condition required for giving a caution is set by using half the reference value stored in the IC-card-revocation-condition table 800 as a criterion. As an alternative, a separate warning condition table can also be provided.

If the unauthorized-use wallet ID number 311 recorded in the IC card 30 of the lost-IC-card finder in an attempt to illegally use the IC card 30 is found to be the same as the wallet ID number 305 recorded in the found IC card at the step 1202, on the other hand, the processing flow goes on to a step 1203 at which the control unit 55 searches the IC-card-finding-record table 600 for the unauthorized-use wallet ID number 311 recorded in the IC card 30 of the lost-IC-card finder in an attempt to illegally use the IC card 30.

The processing flow then proceeds to a step 1204 at which results of the search operation are compared with the contents of the IC-card-revocation-condition table 800 to find out whether or not the number of times an IC card was used illegally so far exceeds the annual-illegal-IC-card-usage count upper limit 801, indicating the number of times an IC card can be used illegally per year or the number of times an IC card was found within the finding time interval 802 that exceeds the maximum number 803. A number of times the IC card was used illegally so far which exceeds the annual-illegal-IC-card-usage count upper limit 801 or a number of times an IC card was found within the finding time interval 802 which exceeds the maximum number 803 indicates an attempt made by the lost-IC-card finder to use the IC card illegally and indicates that the lost-IC-card finder did not request processing to collect the IC card immediately. In this case, the processing flow goes on to the step 1205 at which the control unit 55 transmits a collection requesting signal to the IC card collecting unit 16 to collect the IC card 30 inserted in the IC-card R/W unit 12. Then, the processing flow continues to the step 1206 at which a message explaining the reason why the IC card was collected and a message saying: "Please visit a window at the IC-card issuing institution" are displayed on the display unit 15.

If the comparison of the result of the search operation of the step 1208 with contents of the IC card-IC-card-revocation-condition table 515 carried out at the step 1209 indicates that the collection conditions set in the IC card-IC-card-revocation-condition table 515 are not satisfied, on the other hand, the processing flow goes on to a step 1211 at which the password-input count 312 is extracted from the found IC card 30 and a first multiplier 704 is set from this password-input count 312 and the illegal-password-input count 703 stored in the reward-money-rate table 700 indicating the number of times an illegal password has been entered. In addition, the time interval of the center-transmission time 620 transmitted to the control unit 55 employed in the center apparatus 5 is calculated and a second multiplier 706 is calculated from the time interval.

Then, the processing flow goes on to a step 1212 at which the control unit extracts money data 307 read out from the found IC card 30 and multiplies the money data 307 by a fixed rate 702, the first multiplier 704 and the second multiplier 706.

The processing flow then proceeds to a step 1213 at which the result of the multiplication is added to the amount of money 307 stored in the IC card 30 of the lost-IC-card finder and the result of the addition is transmitted to the terminal unit 2. The control unit 19 of the terminal uses the result of the addition to update the amount of money 307 stored in the memory unit 33 of the IC card 30 of the lost-IC-card finder by means of the IC-card R/W unit 12. In addition, the money data 616 of the IC-card loser is read out from the IC-card-finding-record table 600 and the reward money is subtracted from the money data 616. The result of the subtraction is then recorded as new money data 616. The processing flow then continues to a step 1214 at which an IC card-returning requesting signal is transmitted to an IC card returning unit 47 of the terminal unit 4 in order to return the IC card 30 of the lost-IC-card finder. At the step 1214, the processing is ended.

Figure 13:
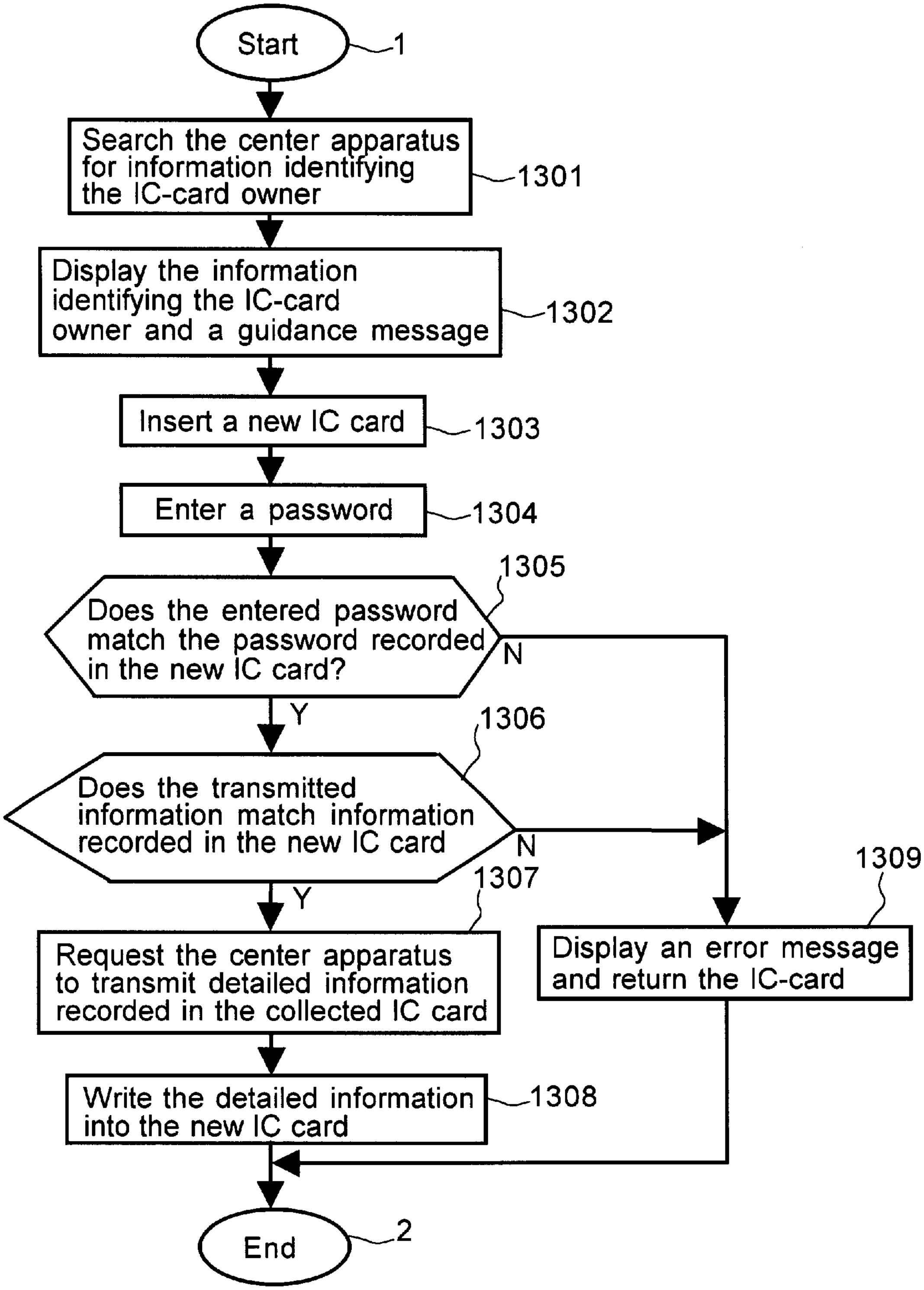
FIG. 13 is a flowchart showing steps in a processing procedure for transferring money data of a found IC card 30 to a new IC card 30.

Next, a processing procedure to be used by a person who is notified that the lost IC card has been found, for transferring the money data stored in the found IC card 30 to a new IC card 30, will be explained by referring to the flowchart shown in FIG. 13.

As shown in the figure, the flowchart begins with a step 1301 at which the person, who is notified that the lost IC card has been found, makes a request for a transfer of the money data stored in the found IC card 30 to the new IC card 30 via the input unit 14 at the terminal unit 3 (or the terminal unit 1 or 2). In response to this request, the control unit 19 displays a message on the display unit 15, requesting the person, who is notified that the lost IC card has been found, enter information for identifying the person. The identification information includes the name, the address, the telephone number and the ID number of the owner of the found IC card.

In response to the message, the person who is notified that the lost IC card has been found, enters his or her name, address, telephone number and ID number to the input unit 14. The control unit 19 then transmits this information to the center apparatus 5 by way of the transmission line 4.

The center apparatus 5 searches the IC-card-finding-record table 600 for the name, the address, the telephone number and the ID number transmitted thereto. If the name, the address, the telephone number and the ID number are found in the IC-card-finding-record table 600, the processing flow goes on to a step 1302 at which the name, the address, the telephone number and the ID number and a message saying: “A lost IC card has been collected” are transmitted to the terminal unit 3. The terminal unit 3 displays the information and the message on the display unit 15.

The processing flow then proceeds to a step 1303 at which the person who is notified that the lost IC card 30 has been found enters a new IC card into the terminal unit 3. In the new IC card 30, the name, the address, the telephone number, the ID number and a password have been recorded as identification information that can be used for proving that the person is the owner of the lost IC card.

The processing flow then continues to a step 1304 at which the person who is notified that the lost IC card 30 has been found enters his or her password via the input unit 14 of the terminal unit 3. In this case, the entered password has to be the same as the password set in the lost IC card.

The processing flow then goes on to a step 1305 at which the control unit 19 examines whether or not the password entered via the input unit 14 matches the password cataloged in the new IC card 30. If the passwords do not match each other, the processing flow proceeds to a step 1309 at which an error message saying: “Do the operations once again” is displayed on the display unit 15 and the IC card is returned to the IC-card R/W unit 12.

If the password entered via the input unit 14 matches the password cataloged in the new IC card 30, that is, if the password entered via the input unit 14 is found to be correct at the step 1305, on the other hand, the processing flow continues to a step 1306 at which the control unit 19 issues a read instruction to the IC-card R/W unit 12, requesting the IC-card R/W unit 12 to read the name, the address, the telephone number, the ID number and the password recorded in the new IC card 30. The name, the address, the telephone number, the ID number and the password read out from the new IC card 30 are then compared with the identification information received earlier from the control center 5. If they do not match each other, the processing flow proceeds to the step 1309 at which the error message saying: “Do the operations once again” is displayed on the display unit 45 and the IC card is returned to the IC-card R/W unit 12.

If the outcome of the comparison carried out at the step 1306 indicates that the name, the address, the telephone number, the ID number and the password read out from the new IC card 30 match the identification information received earlier from the control center 5, on the other hand, the processing flow goes on to a step 1307 at which the control unit 19 requests the control center 5 to transmit the amount of money resulting from the subtraction of the reward money from the amount of money recorded in the found IC card 30, a money record, and a password for unauthorized-use prevention to the terminal 3. When these pieces of information are received from the center apparatus 5, the processing flow continues to a step 1308 at which the control unit 19 writes them into the new IC card 30 by means of the IC-card R/W unit 12.

In this way, information stored in the lost IC card 30 is transferred to the new IC card. It should be noted, however, that the reward money was subtracted from the original amount of money.

It is also worth noting that, since the amount of money resulting from the subtraction of the reward money from the original amount of money 726 recorded in the found IC card 30 has already been recorded on the IC-card-finding-record table 600, it is not necessary to do the subtraction once again.

Finally, the control unit 19 ejects the new IC card 30 containing the updated information, completing the processing.

It should be noted that a person who is notified that the lost IC card has been found via one of the telephones 6*a* to 6*n* or a letter through the post may carry out the same operations at a terminal 1 or one of the terminals 2*a* to 2*n* installed at a banking organization or a public institution.

By the way, if the conditions set in the IC-card-revocation-condition table 800 must be taken into consideration in the collection of an IC card 30 requested by a lost-IC-card finder, a problem may arise in the case of a number of IC cards found at a school or a police station. This is because, in this case, the processing to collect a found IC card is often requested by a special person who is typically a responsible person, such as a schoolmaster or a member of the police. Since the responsible person may request such processing a number of times within a short period of time, the IC card owned by the person inevitably satisfies the revocation condition and is inadvertently revoked by the terminal unit used for requesting the processing.

In order to solve the problem described above, in the case of a responsible person of a facility or an institution at which a number of IC cards may be found, a specific code is added to the IC card 30 of the responsible person so that the IC card 30 is not revoked even if a limit recorded in the IC-card-revocation-condition table 800 is exceeded. As an alternative, an IC-card-revocation-condition table different from the IC-card-revocation-condition table 800 is set separately so that such a problem will not arise. In this way, a responsible person of a facility or an institution at which a number of IC cards may be found can collect a batch of IC cards found in the area under his responsibility.

As described above, in the case of the present embodiment, it is suggested that the rate of reward money be set at a value which varies in dependence upon the amount of money 307 recorded in a found IC card. It should be noted, however, that reward money can always be calculated by using a fixed rate. At any rate, it is possible to adopt any technique for calculating reward money as long as the technique falls within a range allowable by the law or a contract made in conjunction with a banking organization.

In addition, it is possible to cancel the payment of reward money to a person who has received reward money a number of times exceeding a standard reference.

Moreover, it is possible to invalidate and revoke or collect an IC card of a person who has collected an IC card a number of times exceeding a standard reference.

As described above, according to the present invention, a lost IC card used as an 'electronic purse' can be returned to the owner of the IC card or to an institution issuing the IC card in a short period of time and with a high degree of efficiency without placing an undue burden on the lost-IC-card finder, the lost-IC-card owner or the IC-card issuing facility in the process of collecting the lost IC card.

In addition, since a reward is given to a lost-IC-card finder for his or her contribution to the work of collecting a lost IC card without the need to follow a complex procedure, an increase in the lost IC-card collection rate can be expected.

Moreover, since a collected IC card is initialized and recycled, the IC card can be used repeatedly.

Furthermore, a request for collection processing solely aimed at reward money can be avoided, making it possible to prevent the number of fraudulent efforts carried out by unauthorized persons from increasing.

We claim:

1. An IC-card collecting system using an IC card having an embedded microprocessor and an embedded memory externally accessible through said microprocessor with said memory being used for storing at least identification information for individually identifying an owner of said IC card and money data representing the amount of monetary value that said IC card has, said system comprising a center and a terminal unit connected to each other by a communication channel, said terminal unit comprising:

an IC-card read/write means for executing processing to read out and write information from and into said memory embedded in said IC card;

an input means for inputting information on usage classification of said terminal unit itself, said usage classification includes collection classification regarding collection of an IC card inserted in said IC-card read/write means;

communication means for transmitting information read out from said memory embedded in said IC card and inputted information received from said input means to said center and for receiving information to be written into said memory embedded in said IC card from said center on said communication channel; and collection means for collecting an IC card inserted in said IC-card read/write means and transferring money data stored in said IC card from said IC card to said center computer in accordance with a collection instruction transmitted from said center by way of said communication channel and said communication means;

said center comprising:

storage means for storing identification information for identifying each IC-card owner, contact information indicating how to contact each IC-card owner and information representing a money-transaction record of each IC card owner;

communication means for receiving information read out from said memory embedded in said IC card and input information received from said input means from said terminal unit and for transmitting information to be written into said memory embedded in said IC card to said terminal unit; and collection-processing means for interpreting information on usage classification received from said input means and, if said usage classification is collection of IC card inserted in said IC card read/write means, performing the steps of:

sending said collection instruction to said terminal unit;

storing information inclusive of said money data read out from a memory embedded in a found IC card and transferred from said terminal unit to said storage means;

retrieving contact information of the owner of said found IC card from said storage means; and notifying said owner of completion of processing to collect said found IC card by using said contact information.

2. An IC-card collecting system according to claim 1 wherein said center further has means which, after said processing to collect said found IC card with an unknown owner, is used for performing the steps of:

extracting identification information of a lost-IC-card finder from information read out from a memory embedded in an IC card of said lost-IC-card finder inserted in said IC-card read/write means;

storing said identification information and a lost-IC-card-finding date and time in a lost-IC-card-finding-record table; and requesting said collection means of said terminal unit to carry out processing to collect said IC card of said lost-IC-card finder inserted in said IC-card read/write means if the frequency of lost-IC-card-finding by said finder is found to be greater than a predetermined reference value.

3. An IC-card collecting system according to claim 1 wherein said center further has means which, after said processing to collect said found IC card with an unknown owner, is used for performing the steps of:

extracting identification information of a lost-IC-card finder from information read out from a memory embedded in an IC card of said lost-IC-card finder inserted in said IC-card read/write means;

storing said identification information and a lost-IC-card-finding date and time in a lost-IC-card-finding-record table; and requesting said IC-card read/write means to carry out processing to invalidate information stored in said IC card of said lost-IC-card finder inserted in said IC-card read/write means if the frequency of lost-IC-card-finding by said finder is found to be greater than a predetermined reference value.

4. An IC-card collecting system according to claim 1 wherein said center further has a reward-money adding means for adding a predetermined amount of reward money to money data stored in a memory of a lost IC card found by a lost-IC-card finder and inserted in said IC-card read/write means after said processing to collect said found IC card lost by an unknown owner.

5. An IC-card collecting system according to claim 4 wherein said reward-money adding means computes said predetermined amount of reward money by multiplying money data stored in a lost-IC-card by a rate for said money data.

6. An IC-card collecting system according to claim 5 wherein said reward-money adding means subtracts said amount of reward money added to money data of a lost-IC-card finder from money data stored in a lost-IC-card owner.

7. An IC-card collecting system according to claim 6 wherein said center further has means which, after said processing to collect said found IC card with an unknown owner, is used for performing the steps of:

extracting identification information of a lost-IC-card finder from information read out from a memory embedded in an IC card of said lost-IC-card finder inserted in said IC-card read/write means;

storing said identification information and a lost-IC-card-finding date and time in a lost-IC-card-finding-record table; and inhibiting addition of said amount of reward money to money data of said lost-IC-card finder if the frequency of lost-IC-card-finding by said finder is found to be greater than a predetermined reference value.

8. An IC-card collecting system according to claim 7 wherein said center further has means for performing the steps of:

searching said storage means for information indicated by identification information received as a result of insertion of another IC cards owned by a lost IC-card owner who has been informed of collection of his or her lost IC card, into said IC-card read/write means;

adding money data indicated by said identification information to money data stored in said other IC card; and requesting said IC-card read/write means to carry out processing to record the sum of said money data indicated by said identification information and said money data stored in said other IC card into said other IC card.

9. An IC-card collecting system according to claim 8 wherein said center further has collection-processing requesting means for performing the steps of:

interpreting information on a usage classification input from said input means;

comparing an abuse preventing password read out from a memory of an IC card inserted in said IC-card read/write means with a password input from said input means employed in said terminal unit if said usage classification indicates processing other than processing to collect a found IC card; and requesting said collection means employed in said terminal unit to carry out processing to collect said IC card inserted in said IC-card read/write means if said abuse preventing password matches said password input from said input means.

10. An IC-card collecting system according to claim 9 wherein said center requests said collection means to carry out processing to collect a found IC card owned by a lost-IC-card owner after contents of a memory of said IC card have been initialized by said IC-card read/write means.

11. In a system for carrying out monetary transactions using an IC card storing at least identification information for identifying the owner of said IC card and money data representing an amount of monetary value that said IC card has stored therein, which system includes a terminal unit, an electronic-money collecting method, wherein said terminal unit performs the steps of:

receiving a request, from a person finding an IC card, indicating collection of a found IC card, accepting an insertion of said found IC card into said terminal unit;

reading out original money data from said found IC card inserted in said terminal unit;

computing an amount of reward money from said original money data;

carrying out processing to electronically return new money data resulting from subtraction of said reward money from said original money data to the proper owner of said found IC card;

carrying out processing to give said computed amount of reward money to said person finding said found IC card; and disabling further use of said found IC card.

12. An electronic-money collecting method according to claim 11 wherein the amount of reward money is computed by multiplying said original money data read out by said terminal unit by a predetermined parameter stored in a storage means for use in calculation of said amount of reward money.

13. An electronic-money collecting method according to claim 12 further comprising the steps of:

recording a processing to collect a lost IC card by means of a recording means provided therein;

checking the number recordings of processings to collect a lost IC card that have taken place within a predetermined period of time for a particular lost-IC-card finder; and inhibiting a new processing by said lost-IC-card finder to collect a lost IC card if said number of processings to collect a lost IC card exceeds a predetermined reference value.

14. An electronic-money collecting method according to claim 13 wherein, in said processing to give reward money to a lost-IC-card finder, the amount of said reward money is added to money data stored in an IC card owned by said lost-IC-card finder.

15. An electronic-money collecting method according to claim 13 wherein an IC card owned by said lost-IC-card finder is collected if said number of processings to collect a lost IC card exceeds said predetermined reference value.

16. An electronic-money collecting method according to claim 12 further comprising the steps of:

recording a password for allowing manipulation of said money data in said IC card in advance;

requesting an input password prior to manipulation of money data of an IC card;

comparing said input password with a password set for allowing manipulation of money data of said IC card;

recording the number of comparisons resulting in a password-mismatch outcome in said IC card in case said input password does not match said password set for allowing manipulation of money data of said IC card; and increasing or decreasing the amount of reward money in dependence on said number of comparisons.

17. An electronic-money collecting method for use in a system for collecting a lost IC card which stores at least identification information for identifying the owner of said IC card and money data representing the amount of monetary value that said IC card has stored therein, said method executed by said system comprising the steps of:

receiving a request, from a person finding an IC card, indicating collection of a found IC card;

accepting inserting of said found IC card found by a lost-IC-card finder and an IC card owned by said lost-IC-card finder into an IC-card read/writer provider for said system;

reading out money data from said found IC card;

calculating an amount of reward money by using said read-out money data and predetermined standard values;

charging said amount of reward money to money data stored in said IC card owned by said lost-IC-card finder; and collecting money data indicating value of remaining amount resulting from subtraction of said amount of reward money from said read-out money data;

whereby value of said amount of reward money is transferred from said found IC card to said IC card owned by said lost-IC-card finder and remaining value is collected by said system.

18. An electronic-money collecting method in a system, which includes a center computer and a terminal unit connected to said center computer through a communication channel, for carrying out monetary transactions using an IC card storing at least identification information for identifying the owner of said IC card and money data having monetary value, said method comprising the steps of:

receiving a request for collecting money data from an inputting means of said terminal unit;

accepting insertion of a first IC card into said terminal unit;

reading out information including said identification information and said money data from said first IC card;

sending information read out from said first IC card and said request for collecting money data from said terminal unit to said center computer;

storing said information read out from said first IC card into a storage medium of said center computer;

identifying, at said center computer, an owner of said first IC card and a way of contact with said owner of said first IC card on the basis of said identification information;

causing a notification of collection of money data to be forwarded to said owner of said first IC card in accordance with said way of contact; and disabling further use of said first IC card by said terminal unit.

19. A method according to claim 18 further comprising steps of:

accepting insertion of a second IC card into said terminal unit;

calculating an amount of reward money from said money data read out from said first IC card; and transferring money data having value of said amount of reward money to said second IC card thereby value of said reward money is added to money data stored in said second IC card.

20. A method according to claim 19, wherein said storing step stores money data having momentary value of amount resulting from subtraction of said amount of reward money from said read-out money data into said storage medium.

21. A method according to claim 18 wherein said disabling step includes a step of initializing information stored in said first IC card.

22. A method according to claim 18 further comprising the steps of:

accepting inserting of a third IC card into a second terminal unit;

transferring, from said center computer to said second terminal unit, at least said money data in said information read out from said first IC card stored in said storage medium; and storing said money data into said third IC.

23. A method according to claim 22, wherein said transferring step includes steps of determining whether the owner of said third IC card is the same as the owner of said first IC card, and transferring said money data to said second terminal unit if the owner of said third IC card is the owner of said first IC card.

* * * * *